United States Patent [19]

Theurer et al.

[11] 4,129,395
[45] Dec. 12, 1978

[54] CONTAINER LOCK ASSEMBLY

[75] Inventors: John Theurer, Alpine; William C. Guenzel, New Brunswick, both of N.J.; Orville F. Beck, Downingtown, Pa.

[73] Assignee: Theurer Atlantic Incorporated, Newark, N.J.

[21] Appl. No.: 812,897

[22] Filed: Jul. 5, 1977

[51] Int. Cl.² .................. B25G 3/18; F16B 21/02; F16B 21/14
[52] U.S. Cl. .................. 403/317; 24/221 R; 403/323; 403/353
[58] Field of Search .......... 403/315, 316, 317, 321, 403/330, 353, 161, 162, 408, 323, 324; 105/366 R-366 E; 24/221 R, 221 A, 221 K, 221 RC, 73 SM; 85/5 P

[56] References Cited

U.S. PATENT DOCUMENTS

| 3,011,749 | 12/1961 | Kozak | 403/321 X |
|---|---|---|---|
| 3,123,389 | 3/1964 | Biesecker | 24/221 L X |
| 3,331,333 | 7/1967 | Coulson | 105/366 A |
| 3,691,595 | 9/1972 | Bakteman et al. | 24/221 R X |
| 3,747,168 | 7/1973 | Snarskis | 24/221 R |

Primary Examiner—Wayne L. Shedd
Attorney, Agent, or Firm—Clarence A. O'Brien; Harvey B. Jacobson

[57] ABSTRACT

A container lock assembly for securing varying types and quantities of containers onto a platform trailer has a body member including a base portion arrangeable engaging a rail provided on the trailer, and a stem portion extending away from the base portion. Removably attachable to the stem portion of the body member for retaining in place against the rail a container supported on the trailer is a lock pin which is also used to disengage the body member from the rail.

8 Claims, 19 Drawing Figures

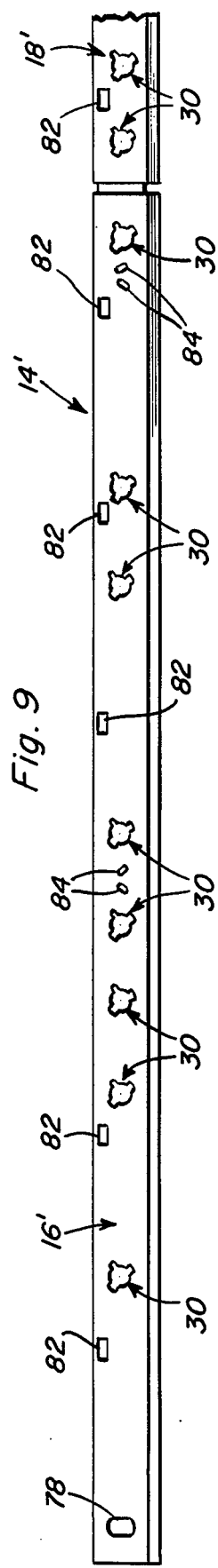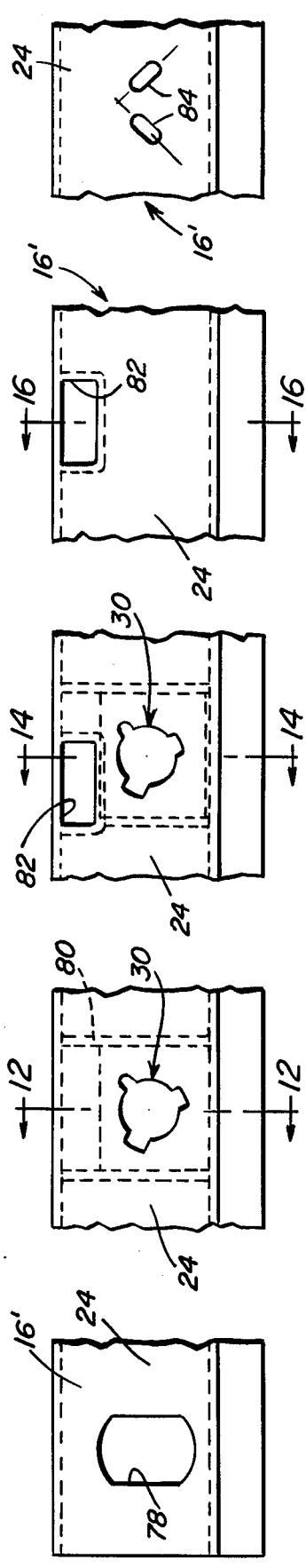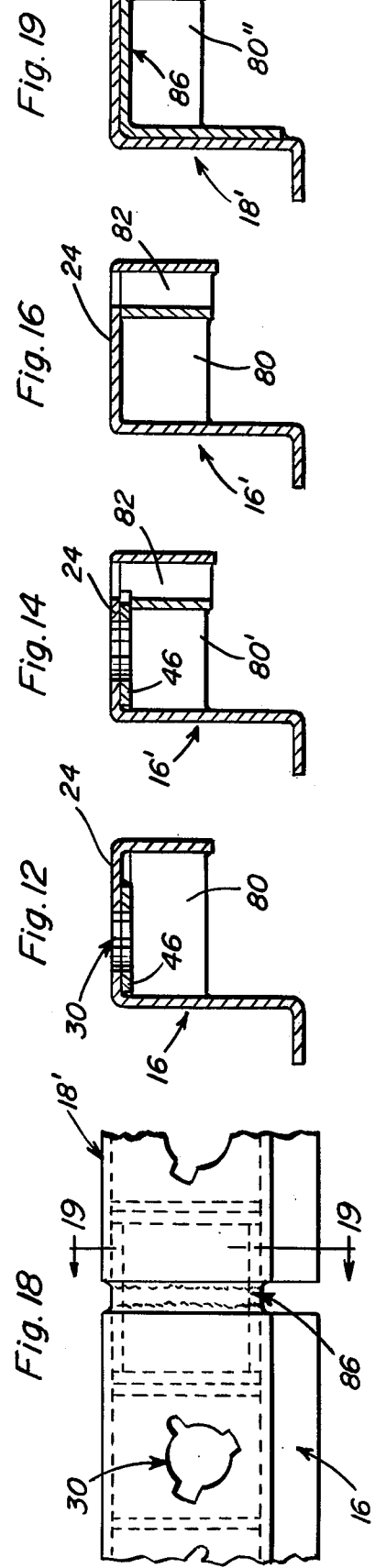

CONTAINER LOCK ASSEMBLY

BACKGROUND OF THE INVENTION

1. Field of the Invention

This invention relates generally to the securing of a container or containers onto a supporting frame, and particularly to a container lock assembly which will permit varying sizes and quantities of containers to be placed on a platform trailer.

2. Description of the Prior Art

The trend toward use of containers to haul and store cargo, and the like, has created the problem of securing the containers to a platform trailer or other suitable vehicle which transports the containers. For example, given a 40 foot nominal platform trailer, a shipper may desire to secure a 40 foot container thereon, or an intermix of containers of various sizes from five feet to 35 feet in place of the single container. Prior systems for securing containers in such a manner were rather limited, inasmuch as the variety of types and sizes of containers which could be secured simultaneously on a 40 foot nominal platform trailer was far less than desired. One known system employs adjustable couplers and corner fittings to secure the containers, and to secure a desired intermix including several of the smaller type containers of only five to ten feet, would require the trailer to be almost 50 feet long.

SUMMARY OF THE INVENTION

It is an object of the present invention to provide a container lock assembly which will permit an intermix of containers 35 feet and less to be secured on a 40 foot nominal platform trailer, even when the intermix is quite varied and quantities depend upon which sizes are to be transported.

It is another object of the present invention to provide a container lock assembly in which all major size containers, those from 20 to 40 feet, are secured with permanent non-removable fittings, and/or container lock assemblies.

It is still another object of the present invention to provide a container lock assembly including a rail with which conventional cargo control fittings, securement fittings such as J-hooks and turn buckles, chain assemblies, webbing anchors, and the like, and conventional stakes permitting use of break bulk racks or converter-sides can be used as desired.

These and other objects are achieved according to the present invention by providing a container lock assembly having: a rail mountable on a vehicle frame; a body member including a base portion arrangeable engaged with the rail, and a stem portion extending away from the base portion; and a lock pin removably attachable to the stem portion of the body member for retaining in place against the rail a container supportable by the rail. The stem portion of the body member has a through hole disposed perpendicularly to the extent of the stem portion from the base portion, with the lock pin being removably arrangeable in the hole of the stem portion.

The base portion of the body member advantageously includes a shank extending from the stem portion and terminating in a pair of tabs spaced from the stem portion and arranged for fitting into a cutout provided in the rail. The tabs thus engage with and disengage from the rail upon a rotating motion about the longitudinal extent of the stem portion, with the latter including a restraining device for engaging the rail and preventing rotation of the base portion relative to the rail once the tabs have been rotated into rail-engaging position away from ears provided in the cutout for initially receiving the tabs. This restraining device preferably includes a rod having a head and mounted in a bore provided in the stem portion of the body member for reciprocating movement relative to the stem portion. A recess provided in the stem portion so as to communicate with the bore receives the head of the rod, while a cavity provided in the stem portion so as to interrupt the bore has inserted therein a compression spring which engages with a flange provided on the rod so as to bias the rod toward the rail. The head of the rod facilitates movement of the rod against the bias of the spring so as to disengage the rod from the rail and permit the body member to be rotated and removed from the cutout provided in the rail.

The cutout provided in the rail is substantially circular in plan, with the pair of ears which receive the tabs of the base portion of the body member being arranged at a smallest included angle of less than 180° about the periphery of the cutout. A groove is arranged substantially one-half the distance of the angle complementary to the smallest included angle between the ears for receiving the rod of the restraining device and preventing rotation of the body member relative to the rail once the body member is in a locked position.

The lock pin preferably has a substantially F-shape, and includes an elongated shaft having a pair of longitudinally spaced ends. A lug is provided at one of the ends of the shaft, with the hole provided in the stem portion being configured for receiving the shaft and lug. At the other of the ends of the shaft is arranged a pair of codirectionally extending projections spaced from one another along the longitudinal extent of the shaft. One of the projections disposed close to the lug is shorter than the other of the projections, and is arranged for engaging a container abutment and retaining the container on the associated rail.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 is an enlarged, fragmentary, schematic, top plan view showing the upper left rail portion of the arrangement seen in FIG. 2.

FIG. 10 is an enlarged, schematic, top plan view showing the cutout required for the permanent retractable twist lock.

FIG. 11 is an enlarged, fragmentary, top plan view showing in detail the first cutout to the right of the area covered in FIG. 10, as seen in FIG. 9.

FIG. 12 is a sectional view taken generally along the line 12—12 of FIG. 11.

FIG. 13 is an enlarged, fragmentary, schematic, top plan view showing in detail the vicinity of the second cutout from the right of the left hand section of the rail shown in FIG. 9.

FIG. 14 is a sectional view taken generally along the line 14—14 of FIG. 13.

FIG. 15 is an enlarged, fragmentary, schematic, top plan view showing in detail the stake socket arranged at the right hand end of the left hand section of the rail shown in FIG. 9.

FIG. 16 is a sectional view taken generally along the line 16—16 of FIG. 15.

FIG. 17 is an enlarged, fragmentary, schematic, top plan view showing angle cutouts for use with conventional hook assemblies, the cutouts appearing at the right hand end of the left hand section of the rail shown in FIG. 9.

FIG. 18 is an enlarged, fragmentary, schematic, top plan view showing the coupling between the two rail sections seen in FIG. 9.

FIG. 19 is a sectional view taken generally along the line 19—19 of FIG. 18.

DESCRIPTION OF THE PREFERRED EMBODIMENTS

Figure 1:
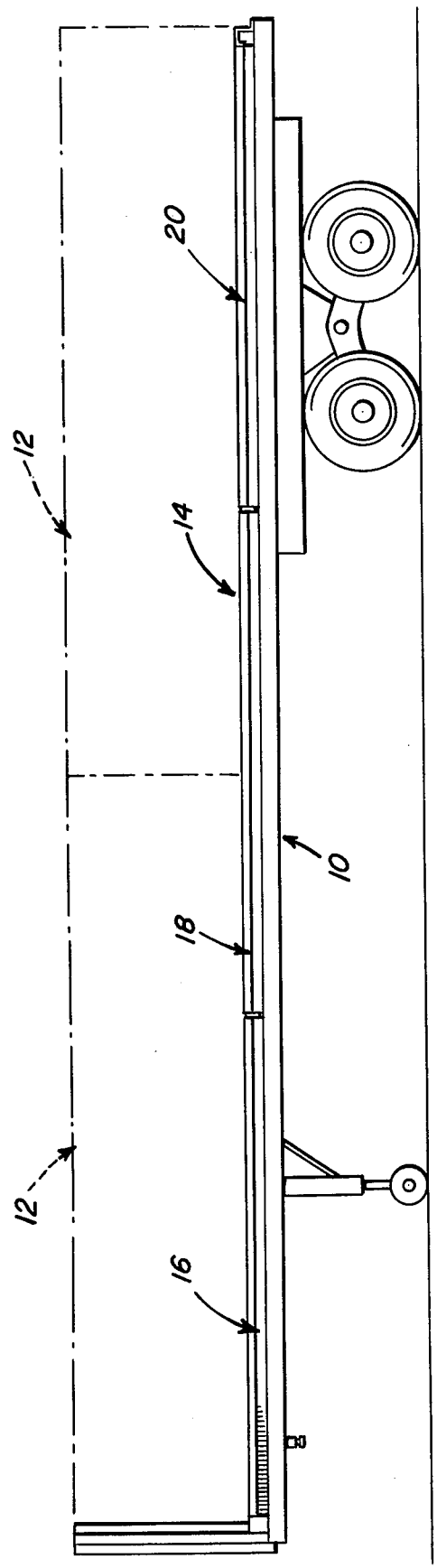
FIG. 1 is a schematic, side elevational view showing a platform trailer fitted with a container lock assembly according to the present invention.
Figure 2:
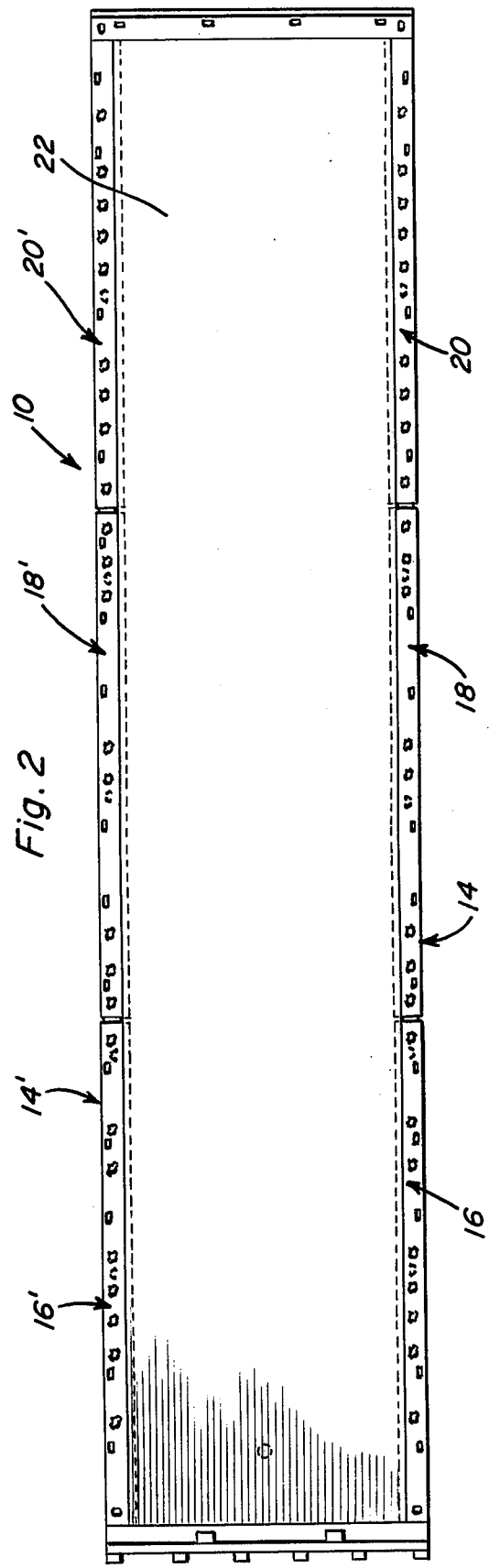
FIG. 2 is a schematic, top plan view showing the platform trailer and lock assembly arrangement of FIG. 1.
Figure 3:
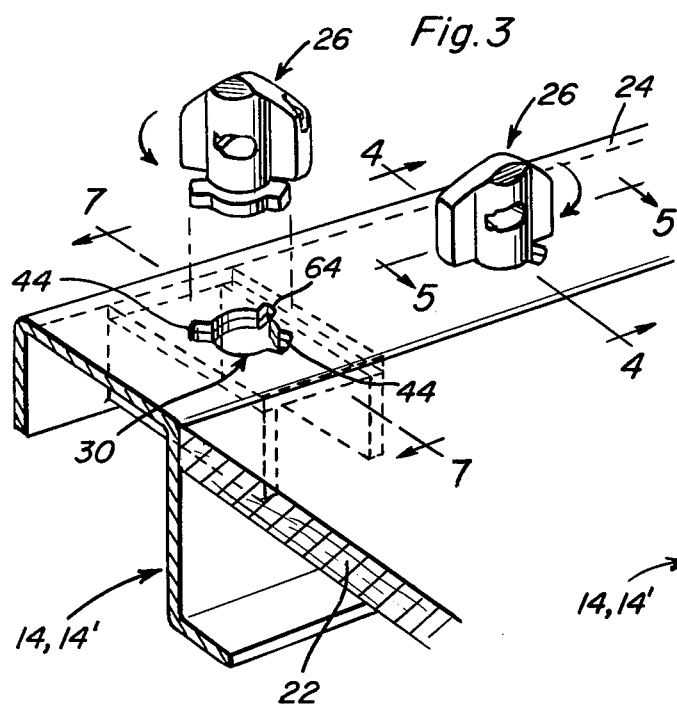
FIG. 3 is a fragmentary, perspective, sectional view showing a detail of one of the side rails seen in FIGS. 1 and 2.
Figure 4:
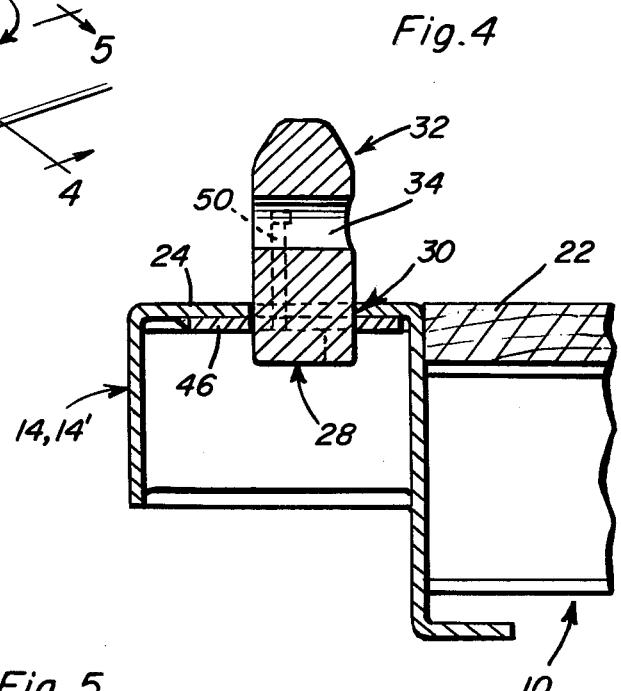
FIG. 4 is an enlarged, fragmentary, sectional view taken generally along the line 4—4 of FIG. 3.

Referring now more particularly to FIGS. 1 and 2 of the drawings, discloses a platform trailer 10 supporting a pair of conventional containers 12. These containers are of a conventional construction, and could be, for example, the 5 foot, 6⅔ foot, 10, 20, and 40 foot containers as manufactured by "ISO", 24 foot type as manufactured by "MATSON", and a 35 foot type fabricated by "SEALAND". Arranged on each longitudinally extending peripheral portion of platform trailer 10 are rails 14 and 14' according to the present invention, each comprising three sections 16, 16', 18, 18', and 20, 20', respectively. A bed 22 is mounted on the chassis 10 between rails 14 and 14' to form a platform portion of the trailer.

Referring now more particularly to FIGS. 3 through 8 of the drawings, a container lock assembly according to the present invention is shown in detail. As can be seen from these figures, each of the rails 14, 14' includes a web 24 disposed substantially coplanar with bed 22 of the platform trailer. Arrangeable engaged with this web 24 is a body member 26 including a base portion 28 which extends into a cutout 30 provided at appropriate points along web 24. Body member 26 also includes a stem portion 32 which extends away from base portion 28 and has a through hole 34 disposed perpendicularly to the extent of the stem portion 32. A lock pin 36 is removably attachable to the stem portion 32 of body member 26 as by insertion into the hole 34 for engaging an abutment 38 forming a portion of a container 12 in order to retain the container 12 in place against the rail 14, 14'.

The base portion 28 of body member 26 includes a shank 40 extending from stem portion 32 and terminating in a pair of tabs 42 and 42' depending perpendicularly from shank 40 in a common plane with one another, and spaced from the adjacent surface of stem portion 32 so as to form a gap. Tabs 42 and 42' are arranged for fitting into ears 44 and 44' provided in the periphery of the substantially circular cutout 30, and because of the aforementioned gap formed between stem portion 32 and tabs 42, 42', rotation of stem portion 32 about its longitudinal extent will cause the tabs 42, 42' to engage against a backing plate 46 and secure the body member 26 to web 24 of an associated rail 14, 14'.

Stem portion 32 of body member 26 includes a restraining device 48 arranged for engaging the associated rail 14, 14' and preventing rotation of the base portion 28 relative to the rail 14, 14'. This device 48 includes a longitudinally extending rod 50 slidably mounted in a bore 52 provided in stem portion 32 for reciprocating motion relative to portion 32, with a recess 54 also being provided in stem portion 32 and arranged in communication with bore 52 so as to receive a head 56 of rod 50. A cavity 58 is formed in stem portion 32 so as to interrupt the longitudinal extent of bore 52, with a suitable coil compression spring 60 inserted in the cavity 58 so that the coils of spring 60 surround the rod 50 and engage a flange 62 affixed to rod 50 and arranged between the end of the spring closest to base portion 28 and the base portion 28 itself. In this manner, spring 60 biases rod 50 downwardly toward base portion 28 and the associated rail 14, 14' with head 56 being disposed in recess 54 so as to permit a force to be applied on rod 50 against the bias of spring 60 in order to cause the terminal end of rod 50 to be disengaged from a groove 64 provided in the periphery of cutout 30.

The ears 44 and 44' formed in the periphery of cutout 30 are advantageously arranged at a smallest included angle between same of less than 180 degrees, with groove 64 being arranged substantially one-half the distance of the angle complementary to the smallest included angle between the ears 44, 44'.

Lock pin 36 has a substantially F-shape, and includes an elongated shaft 66 terminating in a pair of longitudinally spaced ends. A lug 68 is provided at one of the ends of shaft 66, with the hole 34 provided in stem portion 32 being configured for receiving the shaft 66 and lug 68. A pair of projections 70 and 72 extend codirectionally from the other of the ends of shaft 66 in spaced relation to one another relative to the longitudinal extent of shaft 66. Projection 70, being closest to lug 68, is arranged for engaging abutment 38 of a container 12 and retaining the container 12 on the associated rail 14, 14', while the other projection 72 facilitates manipulation of lock pin 36, and also is used to engage head 56 in order to release rod 50 from groove 64.

Shaft 66 is provided with a slot 74 adjacent the other of the ends of shaft 66 for receiving a conventional railroad-type seal (not shown). The portion of the slot 74 which opens into the adjacent end face of shaft 66, at a slant relative to the extent of projection 72, is blocked in a suitable manner, such as by weld 76 to retain the seal.

As can be seen from FIGS. 9 through 19, each of the rails 14, 14', with it being understood that rail 14 is identical in construction, although the flange extends oppositely. Rail 14' includes a plurality of cutouts 30 spaced along the extent thereof as shown. A clearance hole 78 is provided for permitting a retractable twist-lock, not shown but of conventional construction, to protrude through the rail 14'. Further, transverse braces 80 are provided in rail 14' on either side of the cutouts 30 so as to cooperate with the backing plate 46 and rigidify the rail 14' adjacent the cutout 30. Stake pockets 82 are conveniently built into the rail 14' on, for example, 24 inch centers, so as to allow use of conventional break bulk racks and converter-sides (not shown) without any loose fittings. Rail 14' also incorporates angled apertures 84 located, for example, centrally of and at the right hand end of section 16' of rail 14' to accept conventional cargo control fittings (not shown) and for a mode of securing the smaller type containers to rail 14' in various combinations.

Section 16' of rail 14' is coupled to section 18' thereof as by the U-shaped connnector 86 suitably welded or otherwise affixed to the adjacent end portions of sections 16' and 18'. It is to be understood that although three sections are shown coupled together to form each rail 14, 14', the number of sections may vary depending upon the over-all length of the platform trailer or other vehicle on which the rails are mounted.

Operation

To secure a container or containers 12 on a platform trailer 10, body member 26 is inserted into the contoured cutout 30 in the appropriate side rail 14, 14', and the body member 26 is rotated, for example, counterclockwise until the spring loaded rod 50 engages groove 64 provided in the periphery of cutout 30. When four, for example, of the body members 26 are inserted into respective cutouts 30 and locked in the rail 14, 14', a container 12 with which the four body members 26 are associated is ready for loading. After the container 12 is positioned on the stem portions 32 of the body members 26, and rests upon the side rails 14, 14', the lock pin 36 is inserted through the hole 34 provided in stem portion 32 of body member 26, and is rotated, for example, counterclockwise until the casting or abutment 38 of container 12 restricts the travel of projection 70. Lock pin 36 is now locked between body member 26 and abutment 38. With lock pin 36 inserted as described, the container 12 is ready for over-the-road travel.

To unload a container 12, the lock pin 36 is rotated, for example, clockwise and withdrawn from the hole 34 of stem portion 32, and the container can be lifted off the stem portion 32 once all of the lock pins 36 associated with a container 12 have been so removed.

Figure 5:
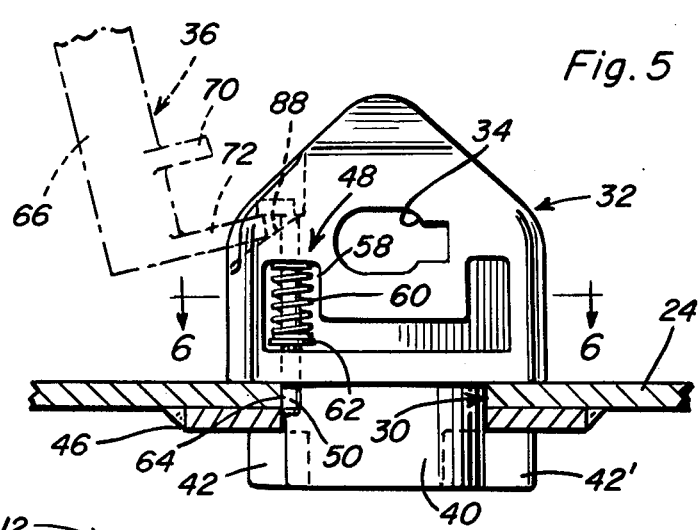
FIG. 5 is an enlarged, fragmentary, sectional view taken generally along the line 5—5 of FIG. 3.
Figure 6:
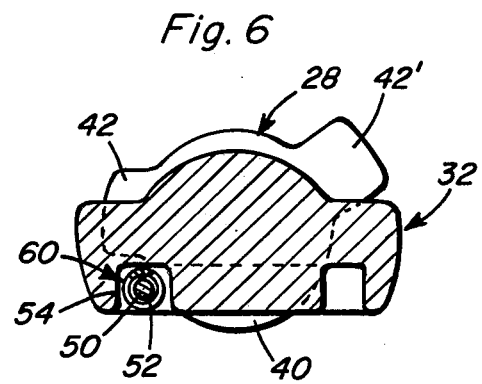
FIG. 6 is a sectional view taken generally along the line 6—6 of FIG. 5, but with the rail removed.
Figure 7:
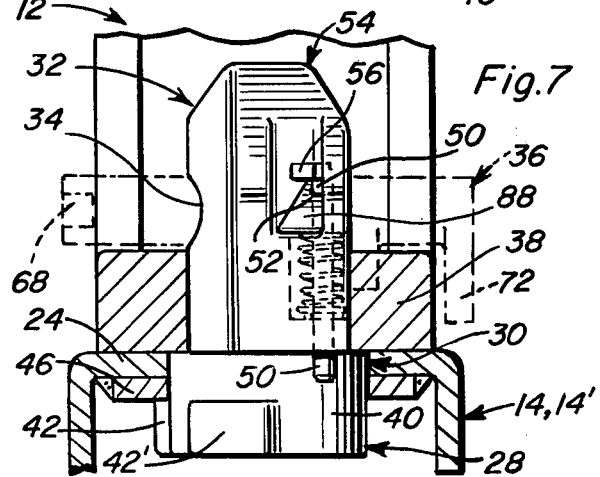
FIG. 7 is an enlarged, fragmentary, sectional view taken generally along the line 7—7 of FIG. 3.
Figure 8:
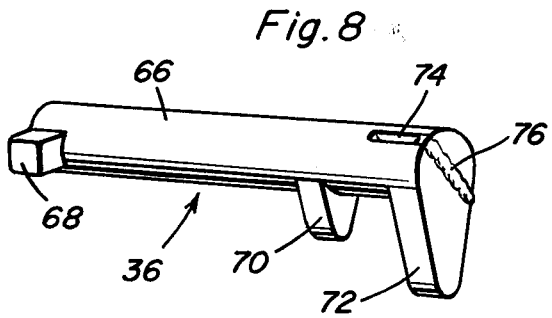
FIG. 8 is a perspective view showing a lock pin for use with a container lock assembly according to the present invention.

To remove the body member 26 from the associated side rail 14, 14', the tapered projection 72 provided on lock pin 36 is inserted below the head 56 of rod 50 so as to abut against the slope surface 88 of recess 54, and an upward pressure applied as can be seen in FIG. 5. When the spring loaded rod 50 is free of the web 24 of the associated side rail 14, 14', body member 26 can be rotated, for example, clockwise and withdrawn from the side rail 14, 14'.

Summary

As can be appreciated from the above description and from the drawings, a container lock assembly according to the present invention provided a rugged and reliable, but versatile system for intermixing various types and sizes of containers on a platform trailer, and the like. Further, once a container is locked on the side rails of the system and the locking lock pin sealed in place, the assemblies are essentially tamper-free, inasmuch as any tampering with the lock assemblies will be immediately discerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A container lock assembly, comprising, in combination:
   (a) a rail mountable on a vehicle frame;
   (b) a body member including a base portion removably engaged with the rail, and a stem portion extending away from the base portion; and
   (c) lock pin means removably attached to the stem portion of the body member for retaining in place against the rail a container to be secured to the rail, the stem portion of the body member having a through hole disposed perpendicularly to the extent of the stem portion, the lock pin means being removably arranged within the hole provided in the stem portion of the body member, the base portion of the body member including a shank extending from the stem portion, and a pair of tabs depending from the shank in a common plane spaced from the stem portion, the rail being provided with a cutout, and the tabs being arranged for fitting into the cutout provided in the rail and engaging with and disengaging from the rail upon a rotating motion of the body member about the longitudinal extent of the stem portion.

2. A structure as defined in claim 1, wherein the lock pin has a substantially F-shape, and includes an enlongated shaft having a pair of longitudinally spaced ends, a lug provided at one of the ends, the hole provided in the stem portion of the body member being configured for receiving the shaft and lug, and a pair of codirectionally extending projections spaced from one another at the other of the ends of the shaft, one of the projections being closer to the lug than the other and arranged for engaging a container and retaining the container on the rail.

3. A structure as defined in claim 2, wherein the stem portion of the body member includes restraining means for engaging the rail and preventing rotation of the base portion relative to the rail.

4. A structure as defined in claim 1, wherein the stem portion of the body member includes restraining means for engaging the rail and preventing rotation of the base portion relative to the rail.

5. A structure as defined in claim 4, wherein a bore is provided in the stem portion of the body member, the bore extending substantially parallel to the extent of the stem portion away from the base portion, and the restraining means including a rod having a head and mounted in the bore provided in the stem portion for reciprocating motion relative to the stem portion, a recess provided in the stem portion in communication with the bore, the head of the rod being disposed in the recess, a cavity provided in the stem portion and interrupting the bore, a compression spring inserted in the cavity, with a flange provided affixed on the rod and arranged engaging the spring, and the spring being arranged biasing the flange, and rod, toward the rail, the head facilitating movement of the rod against the bias of the spring.

6. A structure as defined in claim 4, wherein the cutout provided in the rail is substantially circular in plan and has a pair of ears arranged at a smallest included angle of less than 180° for receiving the tabs of the base member, and a groove arranged substantially one-half the distance of the angle complementary to the smallest included angle between the ears for receiving the rod of the restraining means.

7. A lock member for use in a container lock assembly, comprising a body member including a base portion arrangeable engageable with a rail provided on a vehicle frame, and a stem portion extending away from the base portion, the stem portion of the body member having a through hole disposed perpendicularly to the extent of the stem portion away from the base member, the hole being arranged for removably receiving a lock pin, and the stem portion being further provided with restraining means for engaging the associated rail and preventing rotation of the base portion of the body member relative to the rail, the base portion of the body member including a shank extending from the stem portion, and a pair of tabs depending from the shank in a common plane spaced from the stem portion, the rail being provided with a cutout, and the tabs being arranged for fitting into the cutout provided in the rail and engaging with and disengaging from the rail upon a rotating motion of the body member about the longitudinal extent of the stem portion.

8. A lock pin for use with a container lock assembly and retaining in place against a rail of the assembly a container to be secured to the rail, the lock pin having a substantially F-shape and comprising an elongated shaft having a pair of longitudinally spaced ends, a lug provided at one of the ends, the shaft and lug being insertable into a hole provided in a body member partially forming the lock assembly, and a pair of codirectionally extending projections provided at the other of the ends of the shaft and spaced from one another along the longitudinal extent of the shaft the projections extending in a plane subparallel to, but at a right angle to the extent of the lug, the one of the projections disposed closest to the lug being arranged for engaging a container and retaining the container on the associated rail when the shaft is inserted into the body member of the assembly, the other of the projections being substantially planar and forming means for selectively releasing a spring biased restraining device provided on the body member and permitting the body member to be separated from the associated rail.

* * * * *